Figure 1:
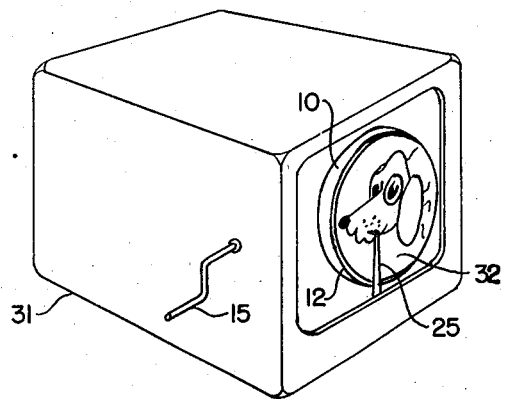

June 28, 1949.                    D. W. MOORE, JR                    2,474,545
                              GRAPHIC FACSIMILE TOY
                               Filed Aug. 3, 1946

INVENTOR.
DAVID W. MOORE, Jr.
BY Laurence B Dodds

Patented June 28, 1949

2,474,545

UNITED STATES PATENT OFFICE 2,474,545

GRAPHIC FACSIMILE TOY

David W. Moore, Jr., New York, N. Y.

Application August 3, 1946, Serial No. 688,380

2 Claims. (Cl. 178—6.6)

This invention relates to graphic toys for transferring an image from an electrographic master record sheet to an electrosensitive record blank and, particularly, to an educational toy which duplicates the operation of commercial facsimile and television apparatus in that a picture is electrically transmitted from one position to another.

In view of the prospect of widespread commercial television and facsimile apparatus in the immediate future, there is a tremendous popular interest, both adult and juvenile, in these subjects and in the technical principles involved. One of the most difficult phases of television and facsimile operation for the general public to grasp is the analysis of the image at the transmitter and the synchronous synthesis of the image at the receiver. The present invention relates to an educational toy by means of which this synchronous analysis and synthesis may be readily demonstrated in its simplest form.

It is an object of the present invention, therefore, to provide a new and improved graphic toy for transferring an image from an electrographic master record to an electrosensitive record blank, by means of which there may be demonstrated the principles of operation of commercial facsimile and television apparatus.

It is another object of the invention to provide a new and improved graphic toy effective to demonstrate in its simplest form the analysis at the transmitter of an image to be transmitted by television or facsimile apparatus and the synchronous synthesis of the image at the receiver.

In accordance with the invention, a graphic toy for transferring an image from an electrographic master record to an electrosensitive record blank comprises a first rotatable disc for a master record, a second rotatable disc for a record blank, and a common manually driven shaft for supporting the discs on opposite ends thereof and for driving them in synchronism. The toy also includes a pair of electrically conductive scanning styli individually movable across the discs, means for driving the scanning styli in synchronism with each other and with the discs, an electrical circuit interconnecting the scanning styli and including supply circuit connections and a housing enclosing all of the above-named elements, but having circular apertures at opposite ends thereof exposing only the record and record blank and their respective scanning styli.

For a better understanding of the present invention, together with other and further objects thereof, reference is had to the following description taken in connection with the accompanying drawing, and its scope will be pointed out in the appended claims.

Figure 2:
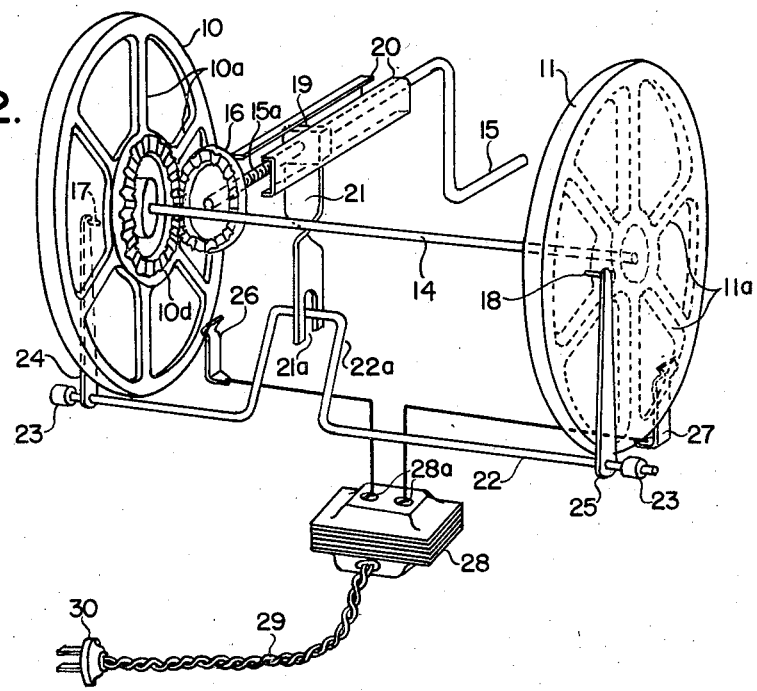
Figure 3:
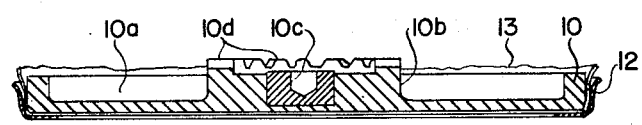

Referring now to the drawing, Fig. 1 is a perspective view of a graphic toy embodying the invention; Fig. 2 is a perspective view in somewhat simplified form of the essential mechanism of the toy of Fig. 1; while Fig. 3 is a cross-sectional view of a rotatable support of the apparatus of Fig. 2 to illustrate the manner of securing the record sheets thereto.

Referring more specifically to the drawing, there is represented a graphic toy for transferring an image from an electrographic master record sheet to an electrosensitive record blank sheet comprising a first rotatable support for a master record, for example, a rotatable disc 10; and a second rotatable support for a record blank, for example, a supporting disc 11. As indicated, the discs 10 and 11 may be provided with suitable stiffening ribs 10a, 10a and 11a, 11a, respectively, for increasing their rigidity. Each of the supporting discs 10 and 11 is provided with a friction ring for retaining the record sheets thereon. As shown more clearly in Fig. 3, the record disc 10 is provided with an annular friction ring 12, which may be pressed over the periphery of the disc to retain thereon a circular record blank sheet 13. The disc 10, Fig. 3, is also provided with a hub 10b in which is inserted an electrically insulating bushing 10c. On the inner face of the hub 10b is formed a crown gear 10d. It will be understood that the supporting disc 11 is similarly constructed, except for the omission of the crown gear.

The toy also includes means for driving the supporting discs 10 and 11 in synchronism. This means may be in the form of a common shaft 14 for supporting and driving the discs 10 and 11. To this end, the shaft 14 is received in the disc bushings, such as the bushing 10c of disc 10. The discs 10 and 11 should either be press-fitted on the shaft 14 or provided with auxiliary keys, set screws or equivalent, for retaining them in fixed relative positions on the shaft 14. The shaft 14 is, of course, supported in suitable bearings, not shown for the purpose of simplicity. The discs 10 and 11 may be rotated in synchronism by means of a hand crank 15 on the end of which is secured a pinion 16 engaging the crown gear 10d.

The toy of the invention also includes a pair of scanning devices, specifically, electrically conductive styli 17 and 18, individually movable across the respective supporting discs 10 and 11. There is also provided means for driving the scanning devices or styli in synchronism with each other and with the supporting discs 10 and 11. This driving means may constitute, in part, the manually rotatable driving crank 15 and the driving connection or gearing 10d between the shaft of the crank 15 and the supporting shaft 14. This driving means for the scanning devices includes a lead screw 15a, which may be formed on the shaft of the crank 15 itself, and a threaded follower 19 engaging the lead screw 15a and slidable in a pair of guides 20, 20. There is also included a driving connection between the follower 19 and the scanning devices 17 and 18. This driving connection includes an arm 21 secured to and depending from the follower 19 and having a forked end 21a. The forked end 21a engages a U-shaped stirrup 22a formed in a shaft 22 mounted in pivots 23, 23. Secured to the shaft 22 at opposite ends are upstanding conductive arms 24 and 25 carrying the styli 17 and 18, respectively.

The toy of the invention also includes an electrical circuit interconnecting the scanning styli 17 and 18 and including brushes 26 and 27 disposed individually to contact the supporting discs 10 and 11, respectively, which are of electrically conductive material. The electrical circuit also includes the low-voltage terminals 28a, 28a of a step-down transformer 28 including the usual connection cord 29 and plug 30 adapted to be connected to the usual 110-volt 60-cycle house-lighting circuit. As indicated in Fig. 1, there is provided a housing 31 of generally rectangular cross section enclosing all of the above-named elements of the apparatus, but exposing only the master record and record blank supports 10 and 11, respectively, and their respective scanning devices.

It is believed that the operation of the graphic toy of the invention will be apparent from the foregoing description. In brief, however, an electrographic master record sheet, such as the sheet 32 illustrated in Fig. 1, is attached to the supporting disc 10 and retained in position by a retaining friction ring 12. This master record sheet may be in the form of a metallic conductive sheet with a picture or other image or design so applied that either the picture is conductive and the rest of the sheet insulating, or that the image is insulating and the rest of the disc conductive. In either case, the image to be transferred stands out on the sheet by reason of its being electrically different from the remainder of the sheet. For example, the image to be transferred may be in the form of a lithograph on a sheet of terne or tin plate. Alternatively, the master sheet may be insulated with a lacquer or equivalent material and the image to be transferred formed by an etching or equivalent process.

An electrosensitive record blank is then similarly secured onto the supporting disc 11. This blank may be in the form of an electrically sensitized paper which is visibly marked by the passage of an electric current through it, it being important that the paper be so marked at a sufficiently low voltage as to enable safe handling of the toy. One electrically sensitized paper suitable for this purpose is a paper impregnated with an electrically conductive solution commercially available as "Faxpaper".

With the master record sheet and the record blank in place as described, it will be assumed that the hand crank 15 has been rotated to move the styli 17 and 18 to the extreme peripheral positions on their respective discs 10 and 11. If now the plug 30 is plugged into the usual 110-volt 60-cycle alternating-current supply and the crank 15 is turned at a moderate rate, the discs 10 and 11 are rotated in synchronism and the styli 17 and 18 are moved approximately radially across their respective discs, tracing similar spiral paths thereon. Since the discs 10 and 11 are mounted on a common shaft and are rotated synchronously and since both are electrically insulated from the shaft 14 and from each other by means of the bushings, such as the bushing 10c of disc 10, a low-voltage electrical circuit may be traced from the terminals 28a of transformer 28 through the brushes 26 and 27, the discs 10 and 11, respectively, the styli 17 and 18, respectively, the arms 24 and 25, respectively, and the shaft 22 which is also conductive. When the stylus 17 contacts a portion of the master record sheet 32 which is conductve, the electrical circuit described is completed from the stylus 17 through the master record 32 and the disc 10, and through the stylus 18 and the electrosensitive sheet mounted on the disc 11. Thus, a relatively low voltage is applied between the stylus 18 and the disc 11 and an electrical current will flow therethrough, making an elemental mark. Thus, if the styli are drawn spirally over the sheets on the discs 10 and 11 by the combined rotation of these discs and the action of the lead screw 15a and follower 19, the image on the master record sheet 32, which is identified by electrically conductive and non-conductive regions, is transmitted electrically to the electrosensitive sheet on the disc 11 and is reproduced there.

Thus it is seen that, by the operation of the hand crank 15 for a period sufficient to cause the stylii 17 and 18 to drive their respective discs 10 and 11 from their peripheries to their centers, the image appearing on the master record sheet 32 is analyzed by the stylus 17 and this analysis is transferred to the stylus 18 by means of which the image is synthesized on the record blank secured on the disc 11.

In addition to the use of the toy of the invention as a simple educational and demonstration device, it may also be utilized in the playing of various games. For example, the electrosensitive paper may be printed with various designs or information, while the image on the master record sheet may be utilized to fill in missing information on the record blank. For example, small aeroplane outlines may be printed on the electrosensitive record blanks and shell bursts may be formed on the master record sheet. The electrical transmission of the shell bursts to the electrosensitive paper results in the hitting of a certain number of planes, depending upon the relative orientation between the master record sheet and the electrosensitive record blank. By forming the image on the master record so that it is not readily visible as, for example, by means of an etched clear lacquer or varnish, the relative orientation of the master record and the electrosensitive record blank is a purely random one, due to the relative positions in which they were clamped to their respective supporting discs by the retainer rings 12. Therefore, the number of hits on the planes would be purely a matter of chance and the basis of a game.

While there has been described what is at present considered to be the preferred embodiment of this invention, it will be obvious to those skilled in the art that various changes and modifications may be made therein without departing from the invention, and it is, therefore, aimed in the appended claims to cover all such changes and modifications as fall within the true spirit and scope of the invention.

What is claimed is:

1. A graphic toy for transferring an image from an electrographic master record to an electrosensitive record blank comprising, a first rotatable support for a master record, a second rotatable support for a record blank, a common shaft for supporting and driving said supports, a pivoted shaft having an actuating bail, a pair of scanning devices mounted on said shaft and individually movable across said supports, a manually rotatable driving means, a driving connection between said driving means and said supporting shaft, said driving means including a lead screw and follower, a driving connection between said follower and said bail, and an electrical circuit directly interconnecting said scanning devices and including supply circuit connections.

2. A graphic toy for transferring an image from an electrographic master record to an electrosensitive record blank comprising, a first rotatable disc for a master record, a second rotatable disc for a record blank, a common manually driven shaft for supporting said discs on opposite ends thereof and for driving said discs in synchronism, a pair of electrically conductive scanning styli individually movable across said discs means for driving said scanning styli in synchronism with each other and with said discs, an electrical circuit interconnecting said scanning styli and including supply circuit connections, and a housing enclosing all of the above-named elements but having circular apertures at opposite ends thereof exposing only the record and record blank and their respective scanning styli.

DAVID W. MOORE, Jr.

REFERENCES CITED

The following references are of record in the file of this patent:

UNITED STATES PATENTS

| Number | Name | Date |
| --- | --- | --- |
| 195,236 | Sawyer | Sept. 18, 1877 |
| 1,815,105 | Howey | July 21, 1931 |
| 1,883,875 | Brown | Oct. 25, 1932 |
| 1,894,967 | Watts | Jan. 24, 1933 |
| 1,985,654 | Finch | May 21, 1935 |
| 2,079,970 | Speed | May 11, 1937 |
| 2,143,875 | Hansell | Jan. 17, 1939 |
| 2,179,002 | Washington | Nov. 7, 1939 |
| 2,255,868 | Wise | Sept. 16, 1941 |
| 2,294,148 | Kline | Aug. 25, 1942 |